United States Patent
Crews

(10) Patent No.: US 6,642,185 B2
(45) Date of Patent: Nov. 4, 2003

(54) BORATE CROSSLINKED FRACTURING FLUID VISCOSITY REDUCTION BREAKER MECHANISM AND PRODUCTS

(75) Inventor: James B. Crews, Willis, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/315,430

(22) Filed: Dec. 10, 2002

(65) Prior Publication Data

US 2003/0083205 A1 May 1, 2003

Related U.S. Application Data

(63) Continuation-in-part of application No. 09/690,547, filed on Oct. 16, 2000, now abandoned.

(51) Int. Cl.$^7$ ................................................. C09K 3/00
(52) U.S. Cl. ........................ 507/273; 507/201; 507/903; 507/922; 166/308
(58) Field of Search ................................ 507/273, 201, 507/903, 922; 166/308

(56) References Cited

U.S. PATENT DOCUMENTS

| | | |
|---|---|---|
| 3,163,219 A | 12/1964 | Wyant |
| 3,710,865 A | 1/1973 | Kiel |
| 3,722,595 A | 3/1973 | Kiel |
| 3,766,984 A | 10/1973 | Nimerick |
| 3,974,077 A | 8/1976 | Free |
| 4,067,389 A | 1/1978 | Savins |
| 4,919,209 A | 4/1990 | King |
| 5,009,797 A | 4/1991 | Penny et al. |
| 5,067,566 A | 11/1991 | Dawson |
| 5,201,370 A | 4/1993 | Tjon-Joe-Pin |
| 5,226,479 A | 7/1993 | Gupta |
| 5,226,481 A | 7/1993 | Le et al. |
| 5,252,235 A | 10/1993 | Sharif |
| 5,253,711 A | 10/1993 | Mondshine |
| 5,259,455 A | 11/1993 | Nimerick et al. |
| 5,393,439 A | 2/1995 | Laramay et al. |
| 5,421,412 A | 6/1995 | Kelly et al. |
| 5,437,331 A | 8/1995 | Gupta et al. |
| 5,441,109 A | 8/1995 | Gupta et al. |
| 5,624,886 A | 4/1997 | Dawson et al. |
| 5,649,596 A | 7/1997 | Jones et al. |
| 5,806,597 A | 9/1998 | Tjon-Joe-Pin et al. |
| 5,950,731 A | 9/1999 | Schuchart et al. |
| 6,060,436 A | 5/2000 | Snyder et al. |
| 6,214,773 B1 | 4/2001 | Harris et al. |

*Primary Examiner*—Philip Tucker
(74) *Attorney, Agent, or Firm*—Madan, Mossman & Sriram, P.C.

(57) ABSTRACT

It has been discovered that borate crosslinked fracturing fluid breaker mechanisms are improved by the inclusion of a cation-releasing material. When cations are released or liberated within the fracturing fluid, they complex with the hydroxide or carbonate pH buffers used within the borate crosslinked fracturing fluid, which in turn reduces the pH of the fracturing fluid. Once the pH is lowered, viscosity reduction (breaking) occurs by uncrosslinking of the polymer within the fracturing fluid, and by initiating or increasing activity of an enzyme breaker, if present. In one embodiment, the cations are divalent cations. The divalent cations are preferably slowly released over a period of time. Two specific, preferred materials for releasing divalent cations are calcium lignosulfonate and calcium chloride, the latter preferably in encapsulated form.

19 Claims, 3 Drawing Sheets

BORATE CROSSLINKED FRACTURING FLUID VISCOSITY REDUCTION BREAKER MECHANISM AND PRODUCTS

CROSS-REFERENCE TO RELATED APPLICATION

This application is a continuation-in-part application from U.S. Ser. No. 09/690,547 filed Oct. 16, 2000 now abandoned.

FIELD OF THE INVENTION

The present invention relates to gelled treatment fluids used during hydrocarbon recovery operations, and more particularly relates, in one embodiment, to methods of "breaking" or reducing the viscosity of treatment fluids containing gelling agents used during hydrocarbon recovery operations.

BACKGROUND OF THE INVENTION

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed. When the fluids are gelled, typically a polymeric gelling agent, such as a solvatable polysaccharide is used. The thickened or gelled fluid helps keep the proppants within the fluid. Gelling can be accomplished or improved by the use of crosslinking agents or crosslinkers that promote crosslinking of the polymers together, thereby increasing the viscosity of the fluid.

The recovery of fracturing fluids may be accomplished by reducing the viscosity of the fluid to a low value so that it may flow naturally from the formation under the influence of formation fluids. Crosslinked gels generally require viscosity breakers to be injected to reduce the viscosity or "break" the gel. Enzymes, oxidizers, and acids are known polymer viscosity breakers. Enzymes are effective within a pH range, typically a 2.0 to 10.0 range, with increasing activity as the pH is lowered towards neutral from a pH of 10.0. Most conventional borate crosslinked fracturing fluids and breakers are designed from a fixed high crosslinked fluid pH value at ambient temperature and/or reservoir temperature. Optimizing the pH for a borate crosslinked gel is important to achieve proper crosslinked stability and controlled enzyme breaker activity.

It would be desirable if a viscosity breaking system could be devised to break fracturing fluids gelled with borate crosslinked polymers by reducing the alkaline pH enough to both break the crosslinked gel viscosity and to increase the enzyme breaker activity, if enzymes are present.

SUMMARY OF THE INVENTION

Accordingly, it is an object of the present invention to provide a method for breaking the viscosity of aqueous treatment fluids gelled with borate crosslinked polymers used in hydrocarbon recovery operations.

It is another object of the present invention to provide a composition and method for breaking borate crosslinked aqueous fluids by lowering the pH of the alkaline fluid to make better use of an enzyme viscosity breaker.

Still another object of the invention is to provide a method and composition for breaking the viscosity of aqueous fluids gelled with borate crosslinked polymers that can provide better clean up of the crosslinked polymer.

In carrying out these and other objects of the invention, there is provided, in one form, a method for breaking viscosity of aqueous fluids gelled with borate crosslinked materials involving first adding to an aqueous fluid gelled with at least one borate crosslinked polymer a material capable of releasing divalent cations. The material is in an amount effective eventually or ultimately (over time) to reduce the pH of the fluid and remove a portion of borate ion from the crosslinked polymer. Next, the cations complex with at least one pH buffer in the fluid, where the buffer is selected from the group consisting of hydroxides or carbonates. Finally, the pH of the fluid is reduced, and at least a portion of the borate ion is removed from the crosslinked polymer. At least 80% of the divalent cations are slowly released over a period of time up to 48 hours, and where about 20% or less of the divalent cations are released in the first 10 minutes.

DETAILED DESCRIPTION OF THE INVENTION

Figure 1:
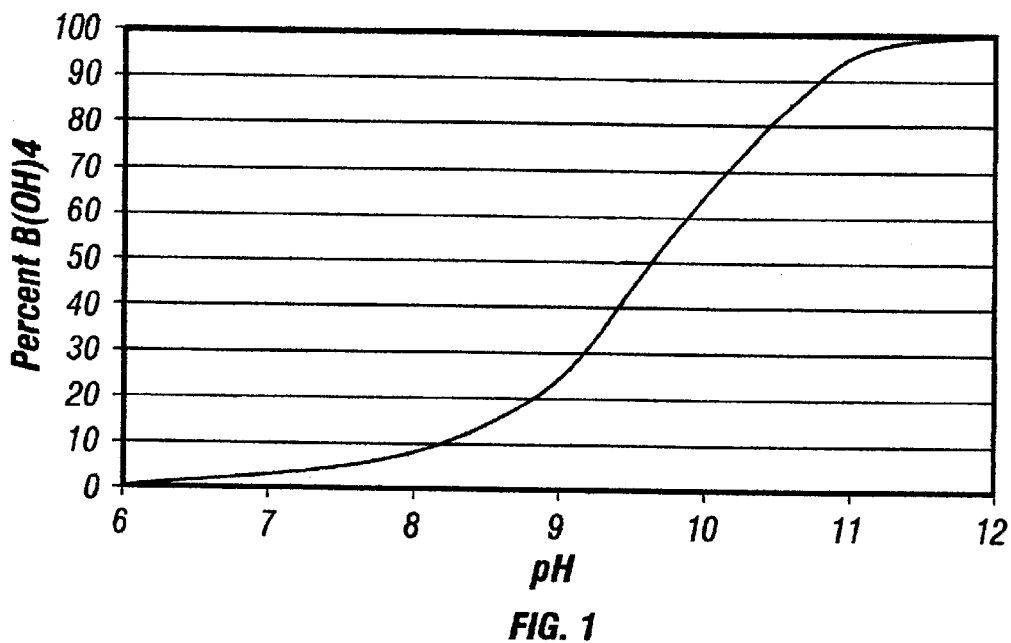
FIG. 1 is a graph of borate ion concentration as a function of a fluid's pH.

A unique borate crosslinked fracturing fluid breaker mechanism in which the fracturing fluid's viscosity is reduced (or is "broken") by use of products that liberate or release cations has been discovered. Products that liberate or release cations can be organic or inorganic calcium or magnesium saturated sequestering agents (such as zeolites, e.g. DB-2), chelants (such as metalloproteins, including calcium-binding ones, and metallothioneins), cation exchange materials (such as bentonite clays, Zeolite A, Zeolite 13X, Zeolites in the Na-SKS5 to -13 series), or absorption/desorption release materials (such as MICROSPONGE™), encapsulated materials, pelletized materials (using binders such as starch and or phosphate with $CaCl_2$, $MgCl_2$, $Ca(NO_3)_2$, etc.) or the liberation may be through thermally unstable chemicals containing cations (such as calcium lignosulfonate and magnesium lignosulfonate). In one non-limiting embodiment, the cations are divalent cations.

The precise breaking mechanism involves the cations released or liberated within the fracturing fluid complexing with the hydroxide or carbonate pH buffers used within the borate crosslinked fracturing fluid, which in turn reduces the fracturing fluid's pH. Once the pH starts to be lowered through the prescribed cationic mechanism, breaking (viscosity reduction) occurs by: 1) uncrosslinking of the fracturing fluid (please see FIG. 1 which shows a graph of borate ion concentration as a function of the fluid's pH); and by 2) an enzyme breaker designed to have a modified activity or higher activity as the pH is lowered. In general, the lower that the pH shifts through the use of a releasing or liberating cation product, the more effective and complete the above-listed breaking mechanisms can be. Through lower pH, the borate crosslinker converts to acid form (boric acid) and uncrosslinking of the crosslinked polymer occurs. Complete borate uncrosslinking and 100 percent enzyme activity can be achieved with the selection and proper use of a releasing or liberating divalent cation product.

In one preferred embodiment of the invention, the viscosity of the gelled, aqueous fluid is broken eventually, gradually and slowly over time. In one more particular embodiment of the invention, the slow and gradual breaking entails that at least 80% of the divalent cations are slowly released over a period of time up to 48 hours, and where about 20% or less of the divalent cations are released in the first 10 minutes. In another embodiment of the invention, at least 80% of the divalent cations are slowly released over a period of 24 hours, and even more specifically slowly released 80% of the divalent cations over a period of 4 hours. In one non-limiting embodiment of this invention, these time periods run from the adding to an aqueous fluid gelled with at least one borate crosslinked polymer the material capable of releasing divalent cations.

A value of the invention is that a fracturing fluid can be designed to have enhanced breaking characteristics. Importantly, better clean-up of the crosslinked polymer from the fracture and wellbore can be achieved thereby. Better clean-up of the crosslinked polymer directly influences the success of the fracture treatment, which is an enhancement of the well's hydrocarbon productivity.

Most conventional borate crosslinked fracturing fluids and breakers are designed from a fixed crosslinked fluid pH value at ambient and/or reservoir temperature. By having products that can lower the pH of the fracturing fluid at reservoir temperature, such as the materials of the invention, the breaking of the fluid can be enhanced beyond existing conventional materials or methods for fracturing. Uncrosslinking of the gel, more effective use of the enzyme breaker, and higher enzyme concentration can be used. The result is more enhanced breaking of the fracturing fluid over conventional materials and methods, which gives better clean-up of the crosslinked polymer from the fracture and wellbore.

In order to practice the method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymer that is useful in the present invention can be any of the hydratable polysaccharides having galactose or mannose monosaccharide components and are familiar to those in the well service industry. These polysaccharides are capable of gelling in the presence of a crosslinking agent to form a gelled base fluid. For instance, suitable hydratable polysaccharides are the galactomannan gums, guars and derivatized guars. Specific examples are guar gum and guar gum derivatives. The preferred gelling agents are guar gum, hydroxypropyl guar and carboxymethyl hydroxypropyl guar. The most preferred hydratable polymers for the present invention are guar gum and carboxymethyl hydroxypropyl guar and hydroxypropyl guar.

The amount of polysaccharide included in the fracturing fluid is not particularly critical so long as the viscosity of the fluid is sufficiently high to keep the proppant particles suspended therein during the fluid injecting step. Thus, depending on the application, the hydratable polymer is added to the aqueous fluid in concentrations ranging from about 15 to 60 pounds per thousand gallons (pptg) by volume of the total aqueous fluid. The most preferred range for the present invention is about 20 to about 40 pptg.

In addition to the hydratable polymer, the fracturing fluids of the invention include a borate crosslinking agent. The crosslinking agent can be any of the conventionally used borate crosslinking agents that are known to those skilled in the art. This includes any of the boron salts or boric acid as borate crosslinking agents. Guar and derivatized guar gels, which are crosslinked by the addition of borate ion donating materials are preferred within this embodiment over other crosslinking agents because they clean up faster and yield higher sand pack permeability than guar gels crosslinked with other crosslinking agents. However, other crosslinking agents can be used with this embodiment besides borate, which may include, but are not limited to, titanate, zirconate, and other metallic and semi-metallic high pH crosslinkers.

In the case of borate crosslinkers, the crosslinking agent is any material that supplies borate ions in solution. The amount of borate ions in solution is dependent on pH (FIG. 1). Thus, the crosslinking agent can be any convenient source of borate ions, for instance the alkali metal and the alkaline earth metal borates and boric acid. A preferred crosslinking additive is preferably a common type of borax present in the range from about 0.25 to in excess of 10.0 pptg of the total aqueous fluid. Preferably, the concentration of crosslinking agent is in the range from about 1.0 to about 3.0 pptg by volume of the total aqueous fluid.

Propping agents are typically added to the base fluid just prior to the addition of the crosslinking agent. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120–1700 $kg/m^3$) of fracturing fluid composition, but higher or lower concentrations can be used as the fracture design required. The base fluid can also contain other conventional additives common to the well service industry such as surfactants, biocides, non-emulsifiers and the like.

In one non-limiting embodiment of the invention, suitable materials for use in the invention that release cations include, but are not necessarily limited to, calcium lignosulfonate, magnesium lignosulfonate, calcium chloride, magnesium chloride, calcium nitrate, magnesium nitrate, zinc nitrate, calcium-binding proteins, magnesium-binding proteins, iron-binding proteins, zinc-binding proteins, zinc metallothionein, zinc sulfate monohydrate, calcium sulfate, magnesium sulfate, manganese sulfate, iron sulfate, magnesium protoporphyrin, iron protoporphyrin, metallothioneins (proteins that can "bind" metals by means of metalthiolate clusters or complexes, the zinc form being the most common), and mixtures thereof. Further materials that are suitable include, but are not necessarily limited to, calcium gluconate, zinc gluconate, calcium acetate, magnesium acetate, zinc acetate, calcium ascorbate, magnesium ascorbate, calcium d-pantothenate, magnesium citrate dibasic, and mixtures within this group or with materials previously mentioned. Calcium-binding proteins of particular use may include, but are not necessarily limited to, EF-handed calcium binding proteins, of which non-limiting examples include calbindin D9K (calB9), calmodulin (calmod), squidulin (squid), and troponin C. Protoporphyrins may also be employed; these are materials that are able to chelate divalent cations. Any or all of the above materials may be encapsulated to permit slow or timed release of the cations. Some of these materials are also known to function as organic or inorganic saturated sequestering agents (e.g. Zeolite DB-2), chelants (e.g. metalloproteins), ion exchange materials (e.g. bentonites, Zeolites A, 13X, Na-SKS series), absorption/desorption release materials (e.g. MICROSPONGE™), and/or thermally unstable chemicals containing divalent or other cations (e.g. calcium or magnesium lignosulfonate). By the term "thermally unstable" is meant chemicals that will release divalent ions gradually once the fluid is heated up. The compounds used to gradual release of divalent ions should be selected to not release more than 20% of the divalent cations during the first 10 minutes of heat up or take greater than 48 hours to release 80% or more of the chemical's divalent ions at the heated temperature. The thermally unstable compounds are selected to gradually chemically decompose and thereby release divalent ions over a specific period of time upon heat up to a specific temperature in order to be useful for this art. The specific temperature can be any temperature point up to 300° F. (149° C.), such as 175° F. (79° C.) used in Examples 4–6. At 175° F. (79° C.) calcium lignosulfonate gradually releases calcium ions useful for the art.

Any or all of the above materials capable of releasing divalent cations may be provided in an extended release form such as encapsulation by polymer or otherwise, pelletization with binder compounds, absorbed on a porous substrate, and a combination thereof. Specifically, the materials may be encapsulated to permit slow or timed release of the cation-generating materials. In non-limiting examples, the coating material may slowly dissolve or be removed by any conventional mechanism, or the coating could have very small holes or perforations therein for the material within to diffuse through slowly. For instance, polymer encapsulation coatings such as used in fertilizer technology available from Scotts Company, specifically POLY-S® product coating technology, or polymer encapsulation coating technology from Fritz Industries could possibly be adapted to the methods of this invention. The above materials capable of releasing cations could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay. Further, the materials for releasing cations may be both absorbed into and onto porous substrates and then encapsulated or coated, as described above.

Preferred materials include, but are not necessarily limited to, calcium lignosulfonate, calcium chloride, magnesium lignosulfonate, magnesium chloride, calbindin D9K, calmodulin, squidulin, troponin C, magnesium protoporphyrin, iron protoporphyrin, zinc metallothionein, calcium nitrate (nitrocalcite), magnesium nitrate (nitromagnesite), magnesium sulfate (Epsom salt), calcium sulfate (soluble anhydrite form), manganese sulfate (jokokuite), zinc sulfate monohydrate (goslarite), iron sulfate (siderotil), calcium saturated Zeolite DB-2, zeolites in the Na-SKS series, calcium gluconate, zinc gluconate, calcium acetate, magnesium acetate, zinc acetate, calcium ascorbate, magnesium ascorbate, calcium d-pantothenate, magnesium citrate dibasic, and mixtures thereof. It is preferred, in one non-limiting embodiment, that the cations released are divalent. The preferred divalent cations released in the method of this invention include, but are not necessarily limited to, calcium, magnesium, zinc, manganese, ferrous iron, titanium, and mixtures thereof.

It is difficult, if not impossible, to specify with accuracy the amount of the material capable of releasing cations that should be added to a particular aqueous fluid gelled with borate crosslinked polymers to fully break the gel, in general. For instance, a number of factors affect this proportion, including but not necessarily limited to, the particular polymer used to gel the fluid; the particular material used to release the cations; the particular cations, per se; the temperature of the fluid; the starting pH of the fluid; whether an enzyme breaker is also used; the particular nature of the enzyme breaker, if present; the concentration of the enzyme; the nature and the concentration of the pH buffers; and the complex interaction of these various factors. Nevertheless, in order to give an approximate feel for the proportions of the cation-generating materials to be used in the method of the invention, the amount of material added may range from about 1.0 to about 30.0 pptg, based on the total weight of the fluid; preferably from about 2.0 to about 20.0 pptg In one preferred, non-limiting embodiment of the invention, an enzyme breaker is also present. In some embodiments, enzyme breakers are preferred because they are not themselves consumed in the breaking process. Suitable enzyme breakers include, but are not necessarily limited to, hemi-cellulases, such as galactosidase and mannosidase hydrolases; cellulases; pectinases; alpha-amylases, and even undefined enzyme breakers and mixtures thereof derived from bacterial extracts that function in the method of this invention, and mixtures thereof. Specific, but non-limiting examples of suitable enzymes include GAMANASE 1.0L hemicellulase from Novo Nordisk, MULTIFECT GC cellulase from Genencor International, PECTINEX® ULTRA SPL pectinase from Novo Nordisk, and SPEZYME FRED alpha-amylase from Biocat, Inc. The particular enzyme breakers useful in the method of the invention may have an activity in the pH range from about 2.0 to about 10.0; preferably from about 5.0 to about 9.0, and are effective to attack the specific borate linkages in the crosslinked polymer gel.

Similarly to the proportions of the cation-generating material, it is difficult, if not impossible, to predict in advance and with accuracy the amount of enzyme breaker to be used in general in the practice of the method of this invention. Nevertheless, in order to give an approximate feel for the proportions of the divalent cation-generating materials to be used in the method of the invention, the amount of enzyme breaker added may range from about 0.01 to about 5.0 gptg (about 0.001% by volume to about 0.5% BV), based on the total volume of the entire fluid; preferably from about 0.1 to about 3.0 gptg (about 0.01% BV to about 0.3% BV).

It is necessary to add pH buffers to the gelled aqueous fluid to increase the pH to generate active borate ion for crosslinking the polymers. Suitable buffers include, but are not necessarily limited to sodium hydroxide, potassium hydroxide, sodium carbonate, potassium carbonate, sodium bicarbonate, sodium sesquicarbonate, and mixtures thereof. The amount of the pH buffer may range from about 0.5 to about 30.0 pptg, based on the total volume of the entire fluid, preferably from about 1 to about 20 pptg.

In another non-limiting embodiment of the invention, the aqueous fluids and methods of this invention may include a scale inhibitor in the aqueous fluid. Suitable scale inhibitors include, but are not necessarily limited to polyaspartates, iminodisuccinates, polyamino acids, carboxylates, acrylates, acrylamides, organophosphonates, alkyl amines, and mixtures thereof. The scale inhibitor may be present in the aqueous fluid in an amount ranging from about 0.002 wt. % to about 0.5 wt. %, preferably from about 0.01 wt. % to about 0.2 wt. %.

In a typical fracturing operation, the fracturing fluid of the invention is pumped at a rate sufficient to initiate and propagate a fracture in the formation and to place propping agents into the fracture. A typical fracturing treatment would be conducted by hydrating a 20 lb to 30 lb/1000 gal water (weight/volume) glactomannan-based polymer, such as guar, in a 2% (w/v) (166 lb/1000 gal) KCl solution at a pH ranging from about 6.0 to about 8.0. For crosslinking this pH range may be from about 8.8 to about 10.5. The material capable of generating cations is added at this stage. During the actual pumping, as described, the pH of the ambient temperature guar gel is raised by the addition of a buffer to about 9.5 to about 10.0, followed by the addition of the enzyme breaker, crosslinking agent, proppant, and other additives, if required.

The present invention will be explained in further detail in the following non-limiting Examples that are only designed to additionally illustrate the invention but not narrow the scope thereof.

GENERAL PROCEDURE FOR EXAMPLES 1–13

Using a Waring blender, 4.8 mls of Drilling Specialties Slurry Guar (guar gum suspended in a mineral oil slurry) was hydrated for 15 minutes within 500 mls of distilled water containing 10 grams KCl salt. Lignotech USA Inc. Borresperse CA calcium lignosulfonate product (1.2 grams) was added to the hydrated guar fluid. The fluid was mixed an additional 5 minutes on the Waring blender. Another sample of the guar polymer fluid was mixed without adding any calcium lignosulfonate. Mixed samples were then placed into 500 ml wide mouth Nalgene plastic bottles. Sesquicarbonate high pH buffer (BA-8 from FMC Corporation, 0.96 grams) was added to and allowed to dissolve in each 500 ml guar fluid to raise the pH of the fluids (took about 3 to 5 minutes of shaking the bottles). Next, 1.0 ml Spezyme FRED enzyme (from Blo-Cat INC.) was quickly added followed by 0.875 mls BXL-1 borate crosslinker (from Benchmark Research). Each sample was capped and shaken vigorously for 60 seconds. The samples were placed in a water bath at 175° F. (79° C.) and visually observed every 30 minutes for viscosity reduction difference between the samples. The samples with calcium lignosulfonate lost viscosity noticeably faster. Most gel breaking occurred over the first four hours.

EXAMPLES 1–3

Examples 1–3 show the effects of using the FRED enzyme only without using a material that generates cations to lower the pH. The general procedure was followed where the BoraFRAQ guar polymer loading was 30.0 pptg (pounds per thousand gallons) (3.6 kg/m$^3$). BoraFRAQ is a borate-crosslinked fracturing fluid available from Baker Hughes. The crosslinker was 1.75 gptg (gallons per thousand gallons; metric units of liter per thousand liters will always be identical) XL-1L plus 16.0 gptg 15% BA-8 solution. The temperature was 175° F. (79° C.).

Figure 2:
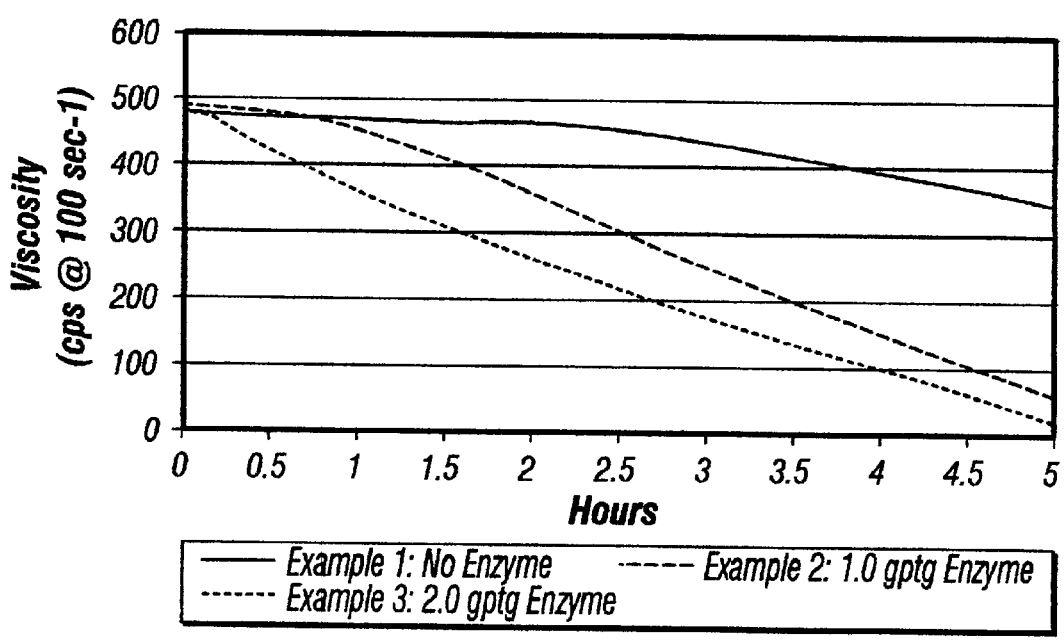
FIG. 2 is a graph of FRED enzyme breaker activity in a non-delayed BoraFRAQ borate crosslinked guar gum system at 175° F. (79° C.)

The results are presented in FIG. 2. It may be observed that the system of Example 2 containing 1.0 gptg enzyme reduced the viscosity considerably and faster than the degradation for the control Example 1 containing no viscosity breaker. As expected, the Example 3 system containing more enzyme (2.0 gptg) reduced the viscosity to lower levels and at a faster rate.

EXAMPLES 4–6

Examples 4–6 show the effects of using the divalent cation-generating material of the invention only without using an enzyme. The divalent cation-generating material was Borresperse CA calcium lignosulfonate sold by LIGNOTECH USA, and abbreviated "CLS". The general procedure was followed where the BoraFRAQ guar polymer loading was 30.0 pptg (3.6 kg/m$^3$). The crosslinker was 1.75 gptg XL-1L plus 16.0 gptg 15% BA-8 solution. The temperature was 175° F. (79° C.).

Figure 3:
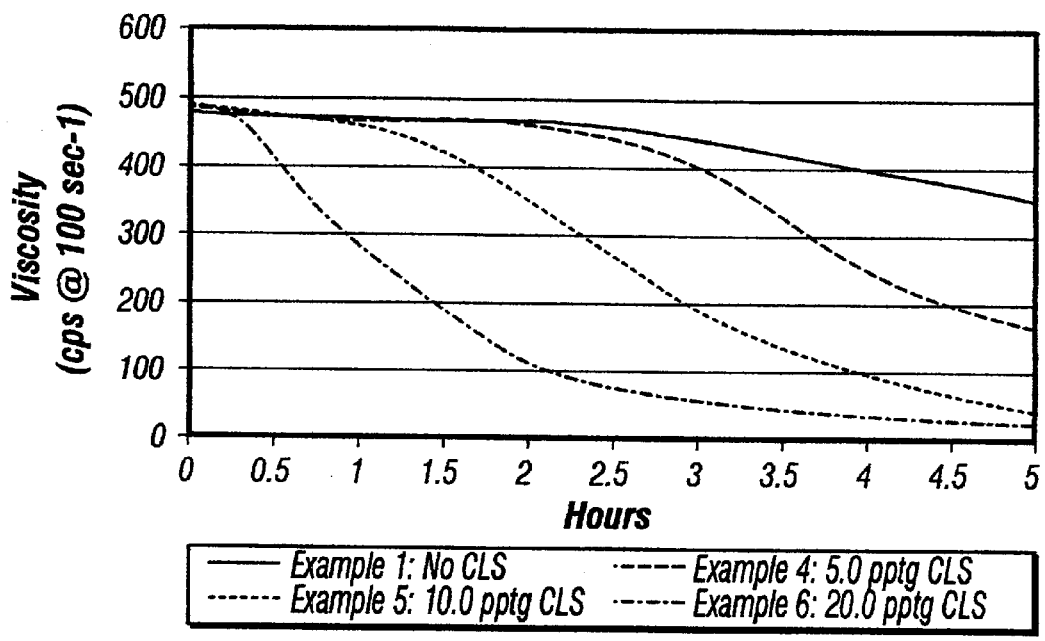
FIG. 3 is a graph of calcium lignosulfonate activity in a non-delayed BoraFRAQ borate crosslinked guar gum system at 175° F. (79° C.)

The results are given in FIG. 3. The graph for control Example 1 containing no CLS shows only the slow, unassisted viscosity degradation with time. Example 4 containing 5.0 pptg (0.6 kg/m$^3$) CLS demonstrated rapid viscosity reduction beginning about 3 hours into the experiment. The Example 5 system containing 10.0 pptg (1.2 kg/m$^3$) CLS showed yet more rapid and greater viscosity reduction, as expected; where the Example 6 system demonstrated even more rapid and complete viscosity reduction beginning in under 30 minutes.

EXAMPLES 7–9

Examples 7–9 show the effects of using an enzyme with and without the divalent cation-generating material of the invention. The general procedure was followed where the BoraFRAQ guar polymer loading was 30.0 pptg (3.6 kg/m$^3$). The crosslinker was 1.75 gptg XL-1L plus 16.0 gptg 15% BA-8 solution. The temperature was 175° F. (79° C.). The CLS was the same one used in Examples 4–6.

Figure 4:
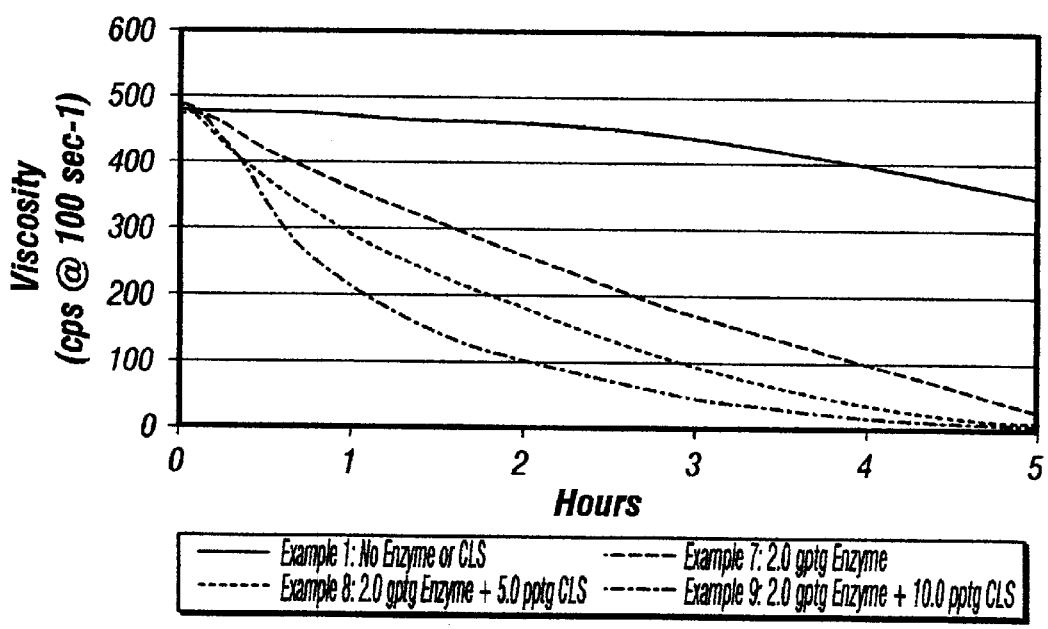
FIG. 4 is a graph of FRED enzyme breaker activity with calcium lignosulfonate in a non-delayed BoraFRAQ borate crosslinked guar gum system at 175° F. (79° C.)

The results are shown in FIG. 4. Again, comparative and control Example 1 used no enzyme or CLS. Example 7 used 2.0 gptg of the "FRED" enzyme from Biocat, and rapid and pronounced viscosity reduction was demonstrated. Further in the Example 8 system, which used 2.0 gptg of the FRED enzyme and 5.0 pptg (0.6 kg/m$^3$) CLS, the viscosity decrease was even more rapid and complete. Finally, the most complete and quick viscosity decrease was achieved with the Example 9 system which used 2.0 gptg FRED enzyme and 10.0 pptg (1.2 kg/m$^3$) CLS.

EXAMPLES 10–12

Examples 10–12 show the effects of using an encapsulated calcium chloride (ECC) as the divalent cation-generating material of the invention. The general procedure was followed where 24% by weight (bw) coated, encapsulated calcium chloride was used in the indicated concentrations. D30FW refers to a KCl-based BoraFRAQ delayed crosslinking guar fracturing system of 30 lb/1000 gal density (3.6 kg/m$^3$). For Examples 10–12 (FIG. 5) and 12–13 (FIG. 6), the crosslinker concentration was 0.4 gptg FRACSAL Waterbase from TBC-Brinadd, Houston, Tex. The pH buffer concentration was 0.5 gptg K47 from Benchmark Research, Midland, Tex.

The calcium chloride in Examples 11–13 is encapsulated with a polyurethane coating by Fritz Industries. Slow release is accomplished by transport through tiny pores in the coating giving the results seen in FIGS. 5 and 6. Rapid release occurs when the shells physically rupture upon fracture closure.

Figure 5:
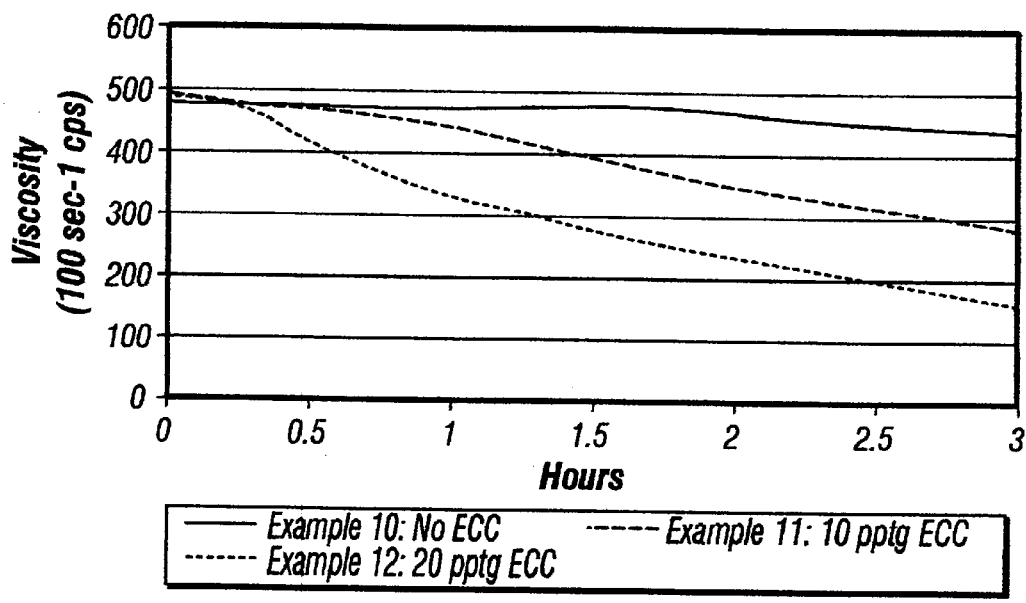
FIG. 5 is a graph of delayed BoraFRAQ borate crosslinked guar gum system at 175° F. (79° C.) showing the effects of 24% BW encapsulated calcium chloride (ECC)

The results are presented in FIG. 5. The control Example 10 provided a reference when no material for generating a cation was used, giving the expected slow, small decrease in viscosity. The Example 11 system containing 10 pptg (1.2 kg/m$^3$) ECC provides a noticeably more rapid decrease in viscosity beginning at about 1 hour into the experiment. Further, the Example 12 system using 20 pptg (2.4 kg/m$^3$) ECC demonstrates a more rapid and complete viscosity reduction beginning shortly after the experiment initiation.

EXAMPLES 12–13

Examples 12–13 show the effects of using an ECC as the divalent cation-generating material of the invention with and without an enzyme breaker. The general procedure was followed where 24% by weight (bw) coated, encapsulated calcium chloride was used in the indicated concentrations.

Figure 6:
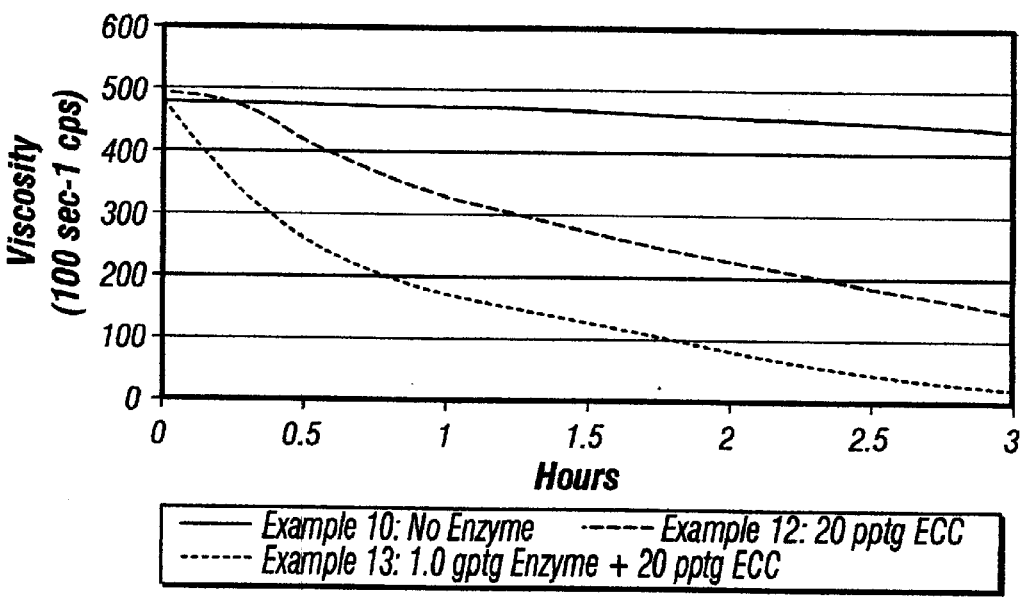
FIG. 6 is a graph of delayed BoraFRAQ borate crosslinked guar gum system at 175° F. (79° C.) showing the effects of 24% BW encapsulated calcium chloride (ECC) with an enzyme breaker.

The results are presented in FIG. 6. The control Example 10 again provided a reference when no material for generating a cation was used. The Example 12 system containing 20 pptg ECC (2.4 kg/m$^3$) is shown again, demonstrating a more rapid and complete viscosity reduction beginning shortly after the experiment initiation. In further contrast, the Example 13 system included both 20 pptg (2.4 kg/m$^3$) ECC and 1.0 gptg FRED enzyme breaker. This latter system gave rapid and very complete viscosity reduction almost immediately upon initiation of the experiment.

The Examples herein clearly demonstrate the efficacy of the method of the invention.

In the foregoing specification, the invention has been described with reference to specific embodiments thereof, and has been demonstrated as effective in providing a method and composition for a borate crosslinked fracturing fluid breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of polymers, crosslinkers, buffers, cation-generating materials, and other components falling within the claimed parameters, but not specifically identified or tried in a particular composition, are anticipated to be within the scope of this invention.

I claim:

1. A method for braking viscosity of aqueous fluids gelled with borate crosslinked materials comprising:

adding to an aqueous fluid gelled with at least one borate crosslinked polymer a material capable of releasing divalent cations, in an amount effective to reduce the pH of the fluid and remove at least a portion of borate ion from the crosslinked polymer;

complexing the divalent cations with at least one pH buffer in the fluid, where the buffer is selected from the group consisting of hydroxides and carbonates; and reducing the pH of the fluid and removing at least a portion of borate ion from the crosslinked polymer where at least 80% of the divalent cations are slowly released over a period of time up to 48 hours, and where about 20% or less of the divalent cations are released in the first 10 minutes.

2. The method of claim 1 where the divalent cations are selected from the group consisting of calcium, magnesium, manganese, zinc, ferrous iron, titanium, and mixtures thereof.

3. A method for breaking viscosity of aqueous fluids gelled with borate crosslinked materials comprising:

adding to an aqueous fluid gelled with at least one borate crosslinked polymer a material capable of releasing divalent cations, in an amount effective to reduce the pH of the fluid and remove at least a portion of borate ion from the crosslinked polymer;

complexing the divalent cations with at least one pH buffer in the fluid, where the buffer is selected from the group consisting of hydroxides and carbonates; and reducing the pH of the fluid and removing at least a portion of borate ion from the crosslinked polymer where at least 80% of the divalent cations are slowly released over a period of time up to 48 hours, and where about 20% or less of the divalent cations are released in the first 10 minutes, and where in adding the material capable of releasing divalent cations, the material is selected from the group consisting of calcium lignosulfonate, magnesium lignosulfonate, calcium chloride, magnesium chloride, calcium nitrate, magnesium nitrate, zinc nitrate, calcium-binding proteins, magnesium-binding proteins, iron-binding proteins, zinc-binding proteins, zinc metallothionein, zinc sulfate monohydrate, calcium sulfate, manganese sulfate, magnesium sulfate, iron sulfate, magnesium protoporphyrin, iron protoporphyrin, calcium gluconate, zinc gluconate, calcium acetate, magnesium acetate, zinc acetate, calcium ascorbate, magnesium ascorbate, calcium d-pantothenate, magnesium citrate dibasic, and mixtures thereof.

4. The method of claim 3 where the material capable of releasing divalent cations is in an extended release form selected from the group consisting of thermally unstable materials, polymer encapsulated materials, materials pelletized with a binder, materials absorbed on a porous substrate, sequestered materials, cationic exchange materials, chelates, and a combination thereof.

5. The method of claim 1 where in adding the material capable of releasing cations, the amount of material added ranges from about 1.0 to about 30.0 pptg based on the total volume of fluid.

6. The method of claim 1 further comprising adding an enzyme to the aqueous fluid; and increasing the activity of the enzyme by reducing the pH.

7. The method of claim 6 where the enzyme is selected from the group consisting of hemicellulase, cellulase, pectinase, and alpha-amylase.

8. The method of claim 6 where in adding the enzyme, the amount of enzyme added ranges from about 0.01 about 5.0 gptg based on the total volume of fluid.

9. The method of claim 1 where in the complexing the divalent cations with pH buffers in the fluid, the pH buffers are selected from the group consisting of sodium hydroxide, potassium hydroxide, sodium carbonate, potassium carbonate, sodium bicarbonate, sodium sesquicarbonate, and mixtures thereof.

10. An aqueous fluid comprising
   at least one borate crosslinked polymer;
   at least one pH buffer, where the buffer is selected from the group consisting of hydroxides and carbonates;
   a material capable of releasing divalent cations in an amount effective to reduce the pH of the fluid and remove at least a portion of borate ion from the crosslinked polymer, where the material is capable of releasing at least 80% of the divalent cations slowly over a period of time up to 48 hours, and releasing about 20% or less of the divalent cations in the first 10 minutes; and
   water.

11. The fluid of claim 10 where the divalent cations are selected from the group consisting of calcium, magnesium, manganese, zinc, ferrous iron, titanium, and mixtures thereof.

12. An aqueous fluid comprising
   at least one borate crosslinked polymer;
   at least one pH buffer, where the buffer is selected from the group consisting of hydroxides and carbonates;
   a material capable of releasing divalent cations in an amount effective to reduce the pH of the fluid and remove at least a portion of borate ion from the crosslinked polymer, where the material is capable of releasing at least 80% of the divalent cations slowly over a period of time up to 48 hours, and releasing about 20% or less of the divalent cations in the first 10 minutes; and
   water
   where the material capable of leasing divalent is selected from the group consisting of calcium lignosulfonate, magnesium lignosulfonate, calcium chloride, magnesium chloride, calcium nitrate, magnesium nitrate, zinc nitrate, calcium-binding proteins, magnesium-binding proteins, iron-binding proteins, zinc-binding proteins, zinc metallothionein, zinc sulfate monohydrate, calcium sulfate, manganese sulfate, magnesium sulfate, iron sulfate magnesium protoporphyrin, iron protoporphyrin, calcium gluconate, zinc gluconate, calcium acetate, magnesium acetate, zinc acetate, calcium ascorbate, magnesium ascorbate, calcium d-pantothenate, magnesium citrate dibasic, and mixtures thereof.

13. The fluid of claim 12 where the material capable of releasing divalent cations is in an extended release form selected from the group consisting of thermally unstable materials, polymer encapsulated materials, materials pelletized with a binder, materials absorbed on a porous substrate, sequestered materials, cationic exchange materials, chelates, and a combination thereof.

14. The fluid of claim 10 where the amount of the material capable of releasing cations ranges from about 1.0 to about 30.0 pptg based on the total volume of fluid.

15. The fluid of claim 10 further comprising an enzyme capable of having its activity increased by reducing pH.

16. The fluid of claim 15 where the enzyme is selected from the group consisting of hemicellulase, cellulase, pectinase, and alpha-amylase.

17. The fluid of claim 15 where the amount of enzyme ranges from about 0.01 to about 5.0 gptg based on the total volume of fluid.

18. The fluid of claim 10 where the pH buffers are selected from the group consisting of sodium hydroxide, potassium hydroxide, sodium carbonate, potassium carbonate, sodium bicarbonate sodium sesquicarbonate, and mixtures thereof.

19. An aqueous fluid comprising
   at least one borate crosslinked polymer;
   at least one pH buffer, where the buffer is selected from the group consisting of hydroxides and carbonates;
   a material capable of releasing divalent cations in an amount effective to reduce the pH of the fluid and remove at least a portion of borate ion from the crosslinked polymer, where the divalent cations are selected from the group consisting of calcium, magnesium, manganese, zinc, ferrous iron, titanium, and mixtures thereof, where the material is capable of releasing at least 80% of the divalent cations slowly over a period of time up to 48 hours, and releasing about 20% or less of the divalent cations in the first 10 minutes;
   an enzyme capable of having its activity for breaking the crosslinked polymer increased by reducing pH; and
   water.

* * * * *

UNITED STATES PATENT AND TRADEMARK OFFICE
CERTIFICATE OF CORRECTION

PATENT NO. : 6,642,185 B2
DATED : November 4, 2003
INVENTOR(S) : James B. Crews

It is certified that error appears in the above-identified patent and that said Letters Patent is hereby corrected as shown below:

<u>Column 7,</u>
Line 63, please delete "Blo-Cat" and insert therefore -- Bio-Cat --.

<u>Column 9,</u>
Line 61, please delete "braking" and insert therefore -- breaking --.

Signed and Sealed this

Ninth Day of March, 2004

JON W. DUDAS
*Acting Director of the United States Patent and Trademark Office*